Figure 1:
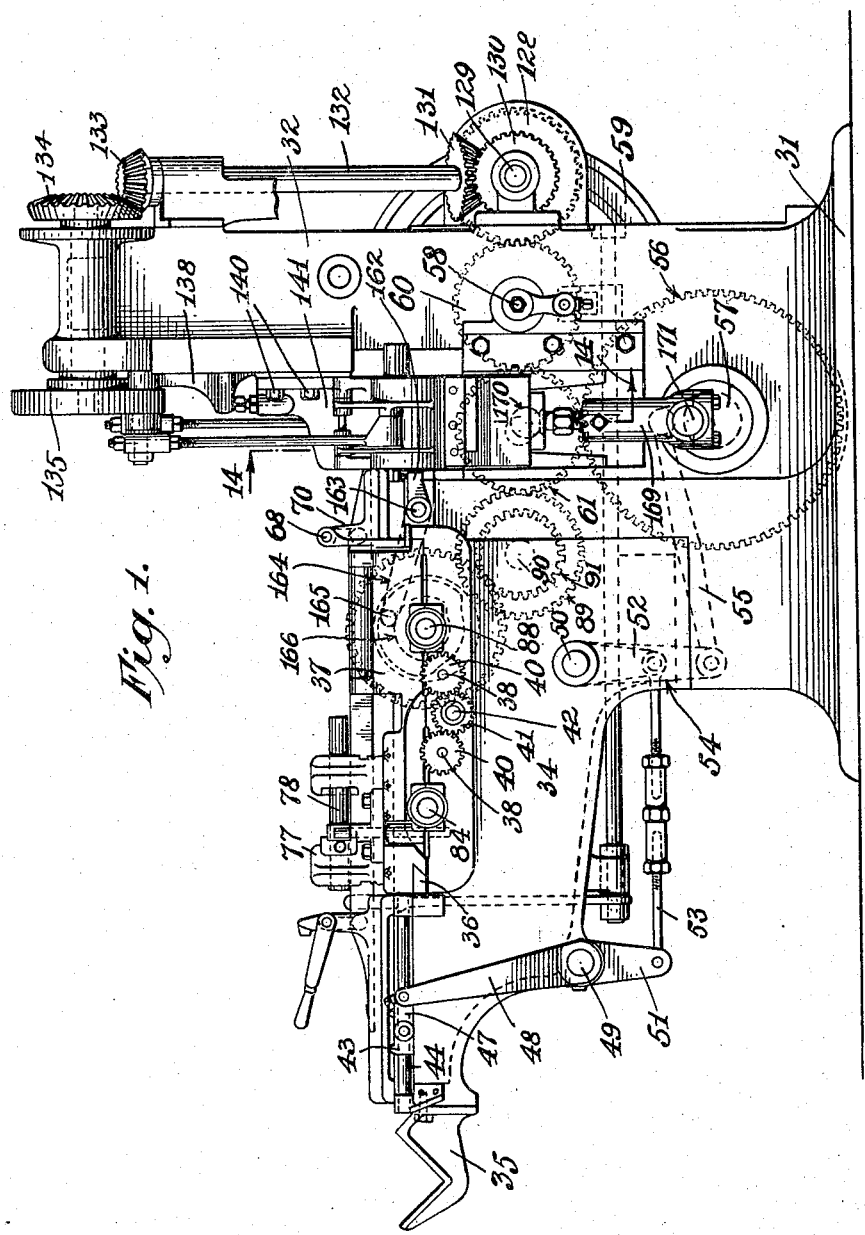

P. R. HAHNEMANN.
CAN BODY FORMING MACHINE.
APPLICATION FILED OCT. 15, 1913.

1,200,190.

Patented Oct. 3, 1916.
11 SHEETS—SHEET 3.

Attest:

Inventor:
by Paul R. Hahnemann
Atty.

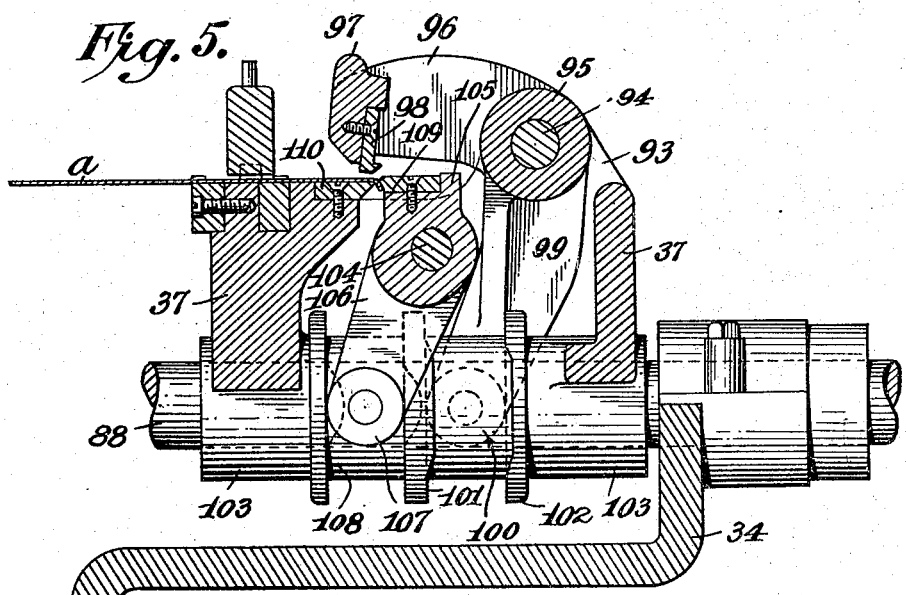
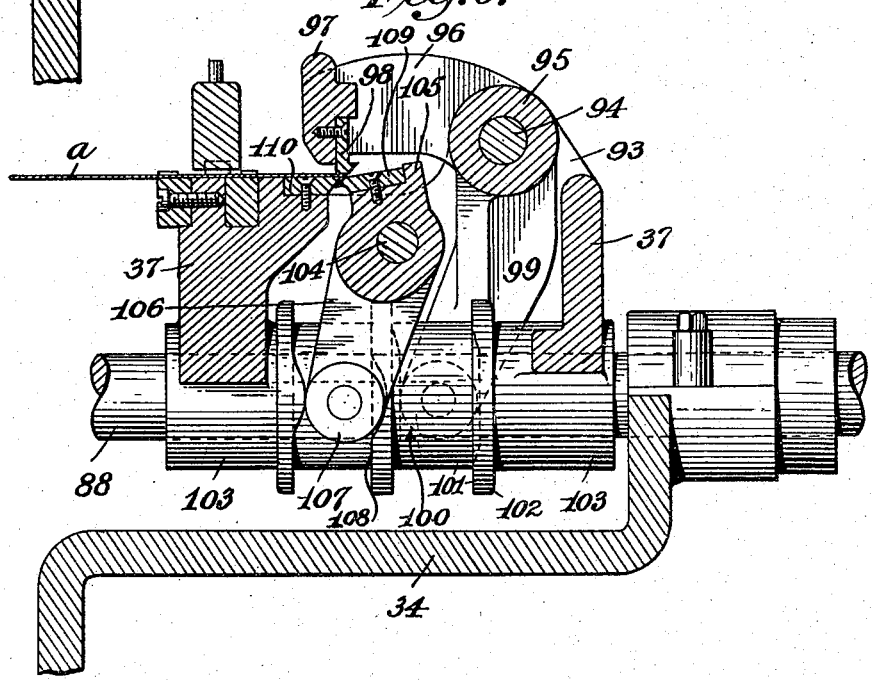

P. R. HAHNEMANN.
CAN BODY FORMING MACHINE.
APPLICATION FILED OCT. 15, 1913.
1,200,190.
Patented Oct. 3, 1916.
11 SHEETS—SHEET 5.
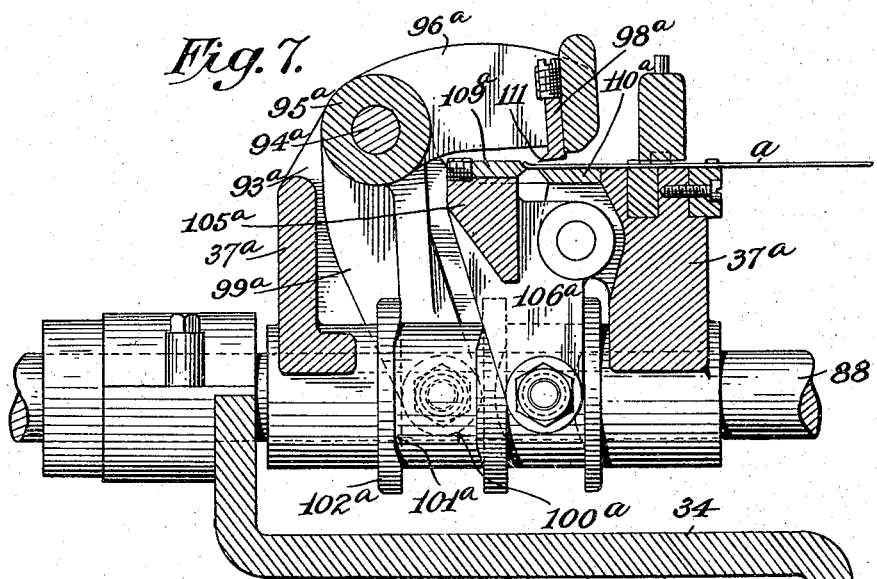
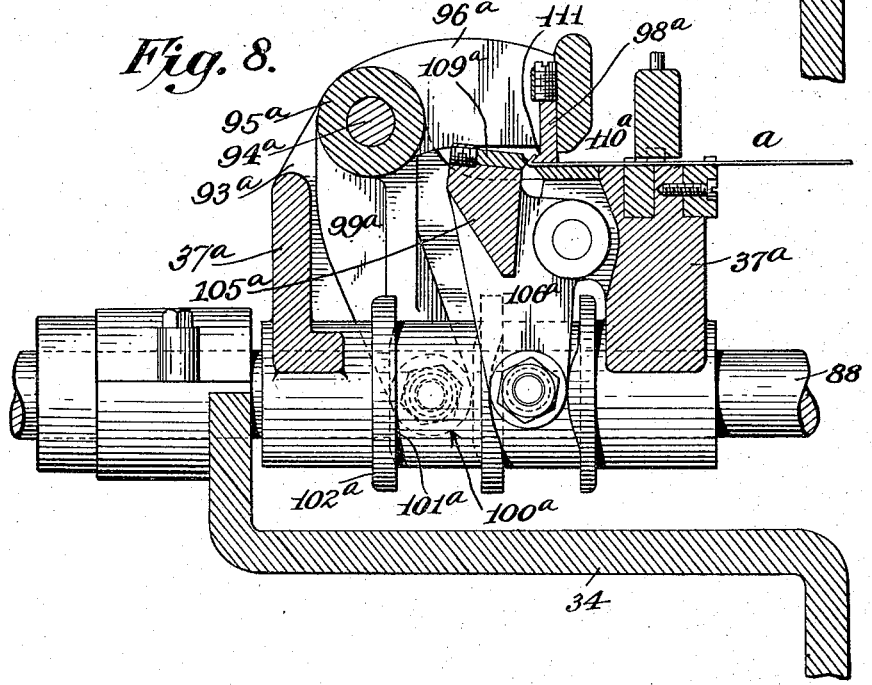

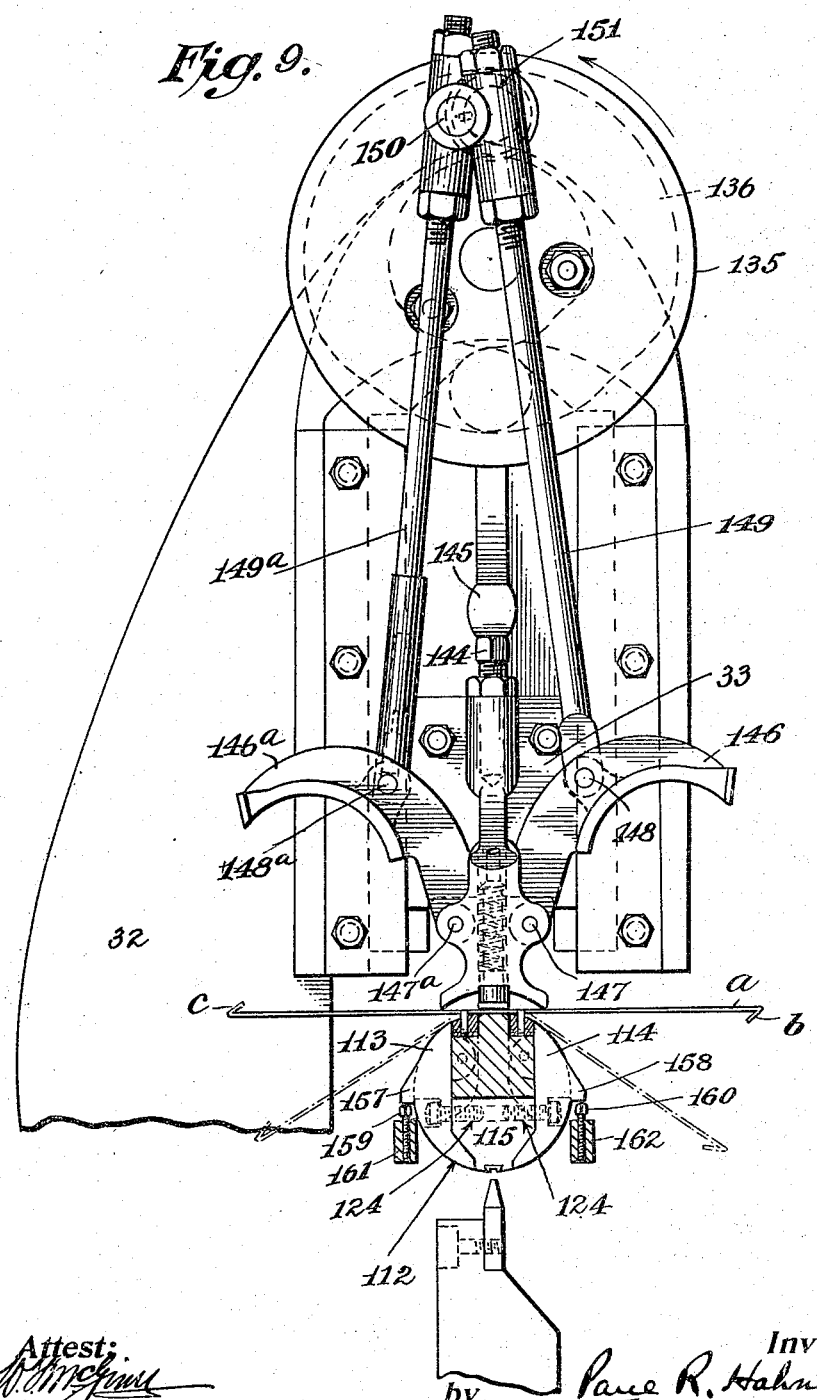

P. R. HAHNEMANN.
CAN BODY FORMING MACHINE.
APPLICATION FILED OCT. 15, 1913.

1,200,190.

Patented Oct. 3, 1916.
11 SHEETS—SHEET 7.

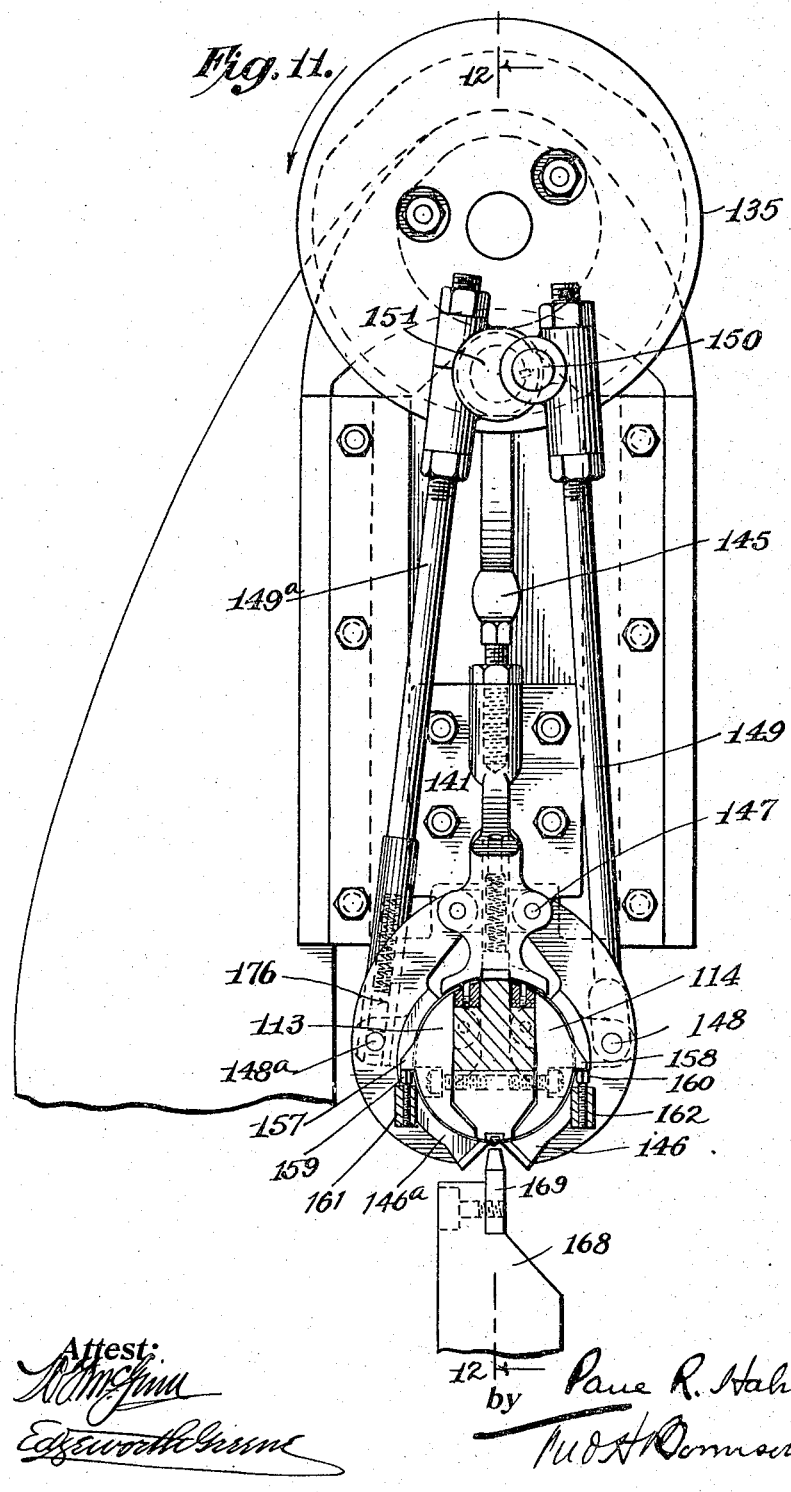

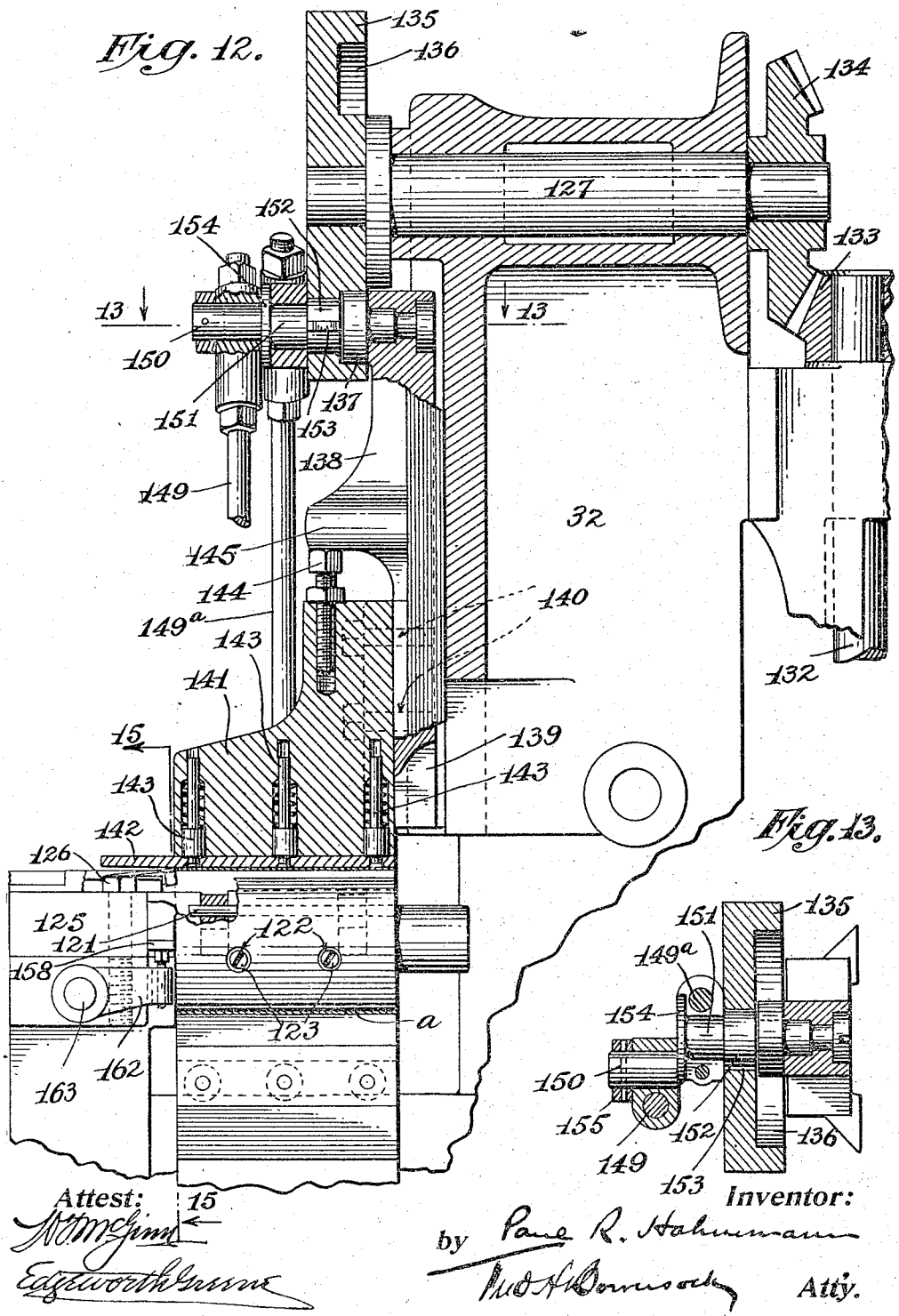

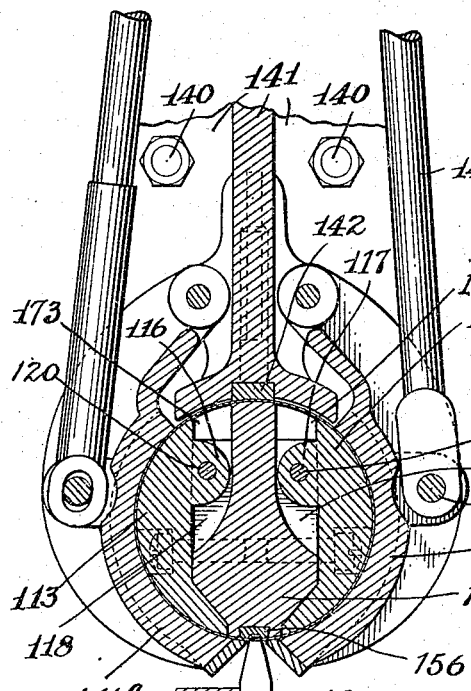
Fig. 14.
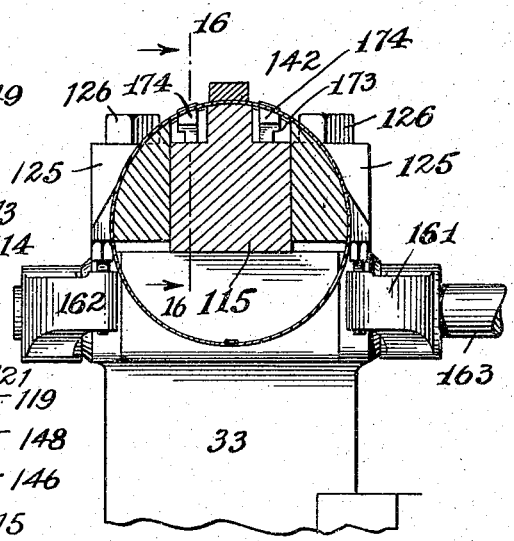
Fig. 15.
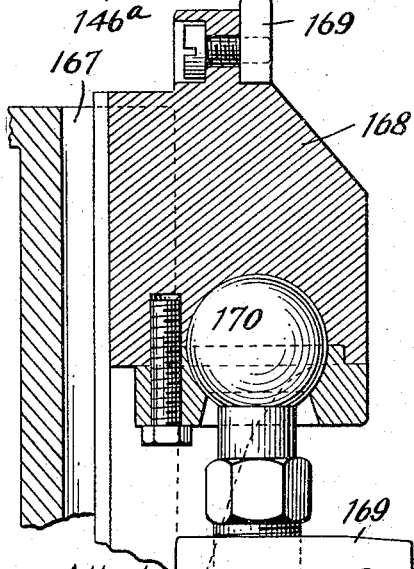
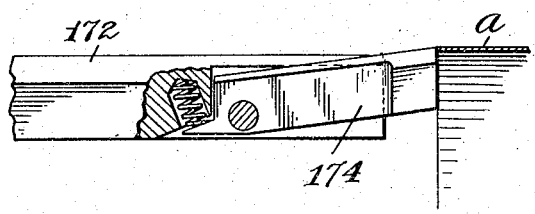
Fig. 16.

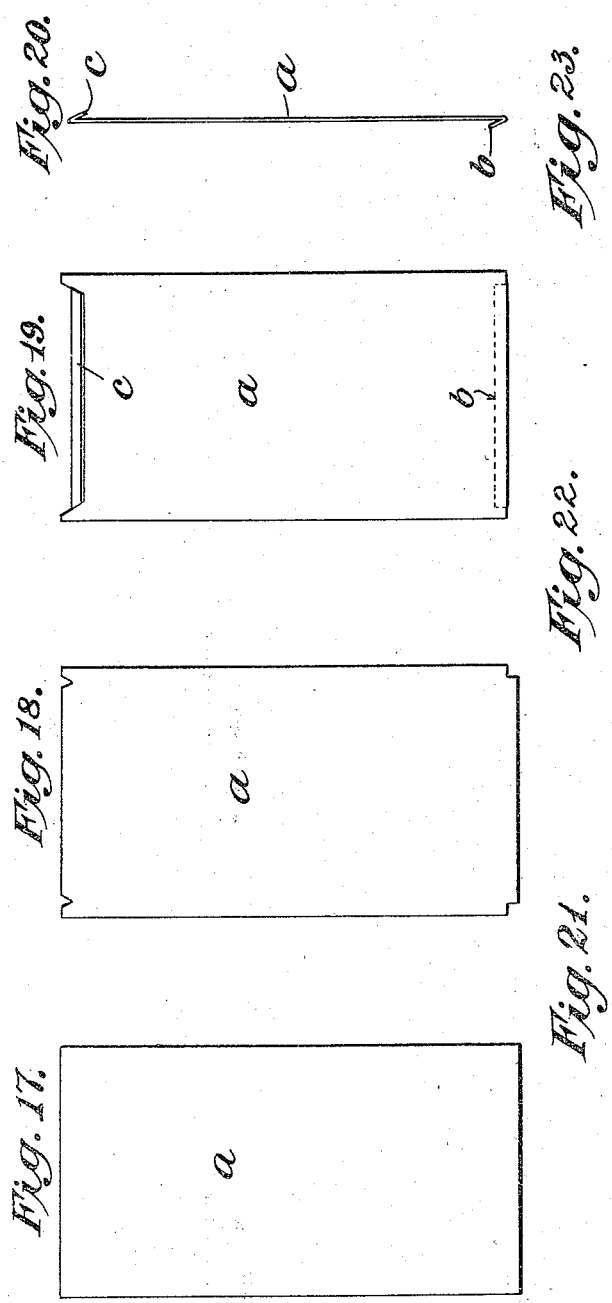
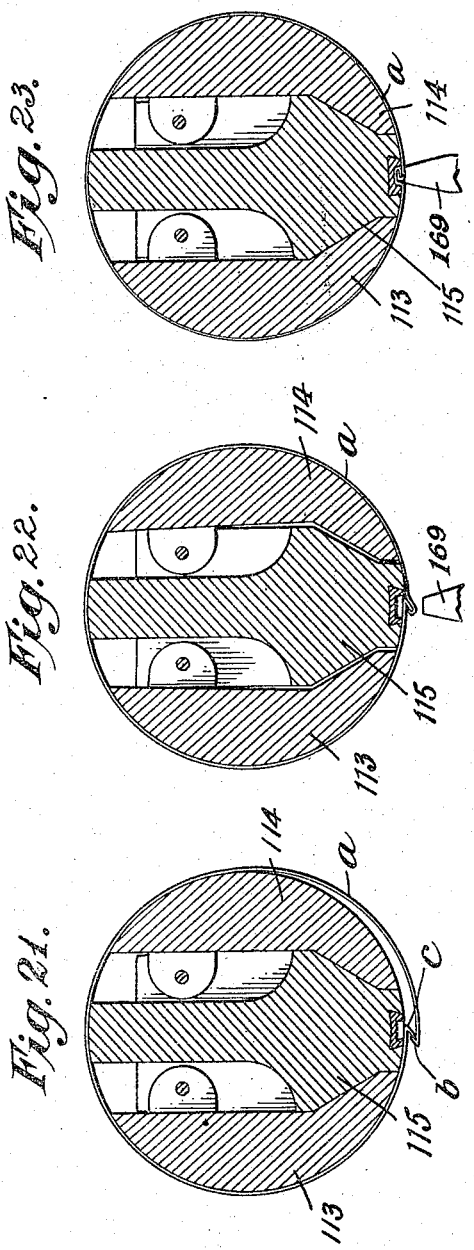

UNITED STATES PATENT OFFICE.

PAUL R. HAHNEMANN, OF MOUNT VERNON, NEW YORK.

CAN-BODY-FORMING MACHINE.

1,200,190. Specification of Letters Patent. Patented Oct. 3, 1916.

Application filed October 15, 1913. Serial No. 795,270.

*To all whom it may concern:*

Be it known that I, PAUL R. HAHNEMANN, a citizen of the United States, and a resident of Mount Vernon, in the county of Westchester and State of New York, have invented certain new and useful Improvements in Can-Body-Forming Machines, of which the following is a specification.

This invention relates to machines for automatically shaping sheet-metal blanks to the desired forms of body portions of containers commonly known as tin cans, and then joining or hermetically securing to each other the meeting edges of the formed blank, which is then ready for the edge-flanging operation preliminary to the securing thereto of the top and bottom or end portions of the container by the process known as double seaming.

The invention more particularly contemplates a can-body forming machine to which the flat blanks, from which said bodies are to be formed, are fed in succession, the machine first operating upon each blank to fold or bend back upon itself each of two opposite edges to provide what may be termed a hook, said hooks being located on opposite sides of the blank whereby, when said end edges are brought together, they may be made to engage each other, or be interhooked, the machine thereafter automatically curving or bending each blank to the desired configuration, interlocking the hooks at the end edges thereof, compressing the interhooked portions to form a substantially solid and tight seam or joint, and then ejecting the formed body from the machine.

One of the principal objects of the present invention is the provision of a machine which, while all of the steps of its operation are automatic, from the feeding thereinto of the flat blank to the ejectment therefrom of the formed body, is nevertheless comparatively simpler, and therefore less expensive, in maintenance as well as in first cost, than other machines of this character now in use, and yet one in which nothing in the way of efficiency and dependability is sacrificed for simplicity and comparatively low cost of manufacture and maintenance.

One of the more serious objections to many of the can-body forming machines now in use is the comparatively high cost of extra parts for substitution in order to equip the machine for any one of a number of different sizes and shapes of can bodies, not to speak of the time and effort usually required to effect this substitution of parts and readjustment of the machine. My invention therefore further contemplates a machine in which simple and easily-effected changes of comparatively inexpensive parts thereof will suffice to adapt the same for the production of any one of the various standard sizes and shapes of can bodies.

In addition to embodying in the machine the general improvements for the purposes outlined above, the invention may be said to reside more specifically in improved means for forming the oppositely disposed "hooks" at the end edges of the blank, for expanding the horn or mandrel and mounting the same in such manner as to make it easily and readily removed and replaced and with equal facility properly adjusted in the machine, and in the improved mechanism employed for actuating the folding wings which coöperate with the horn or mandrel to form the blanks, at the same time properly timing operations thereof.

In addition to the above, the invention further contemplates improvements in the general design of the machine and in the location and arrangement of its various parts.

My invention will be more readily understood by reference to the accompanying drawings, forming a part of this specification, in which—

Figure 2:
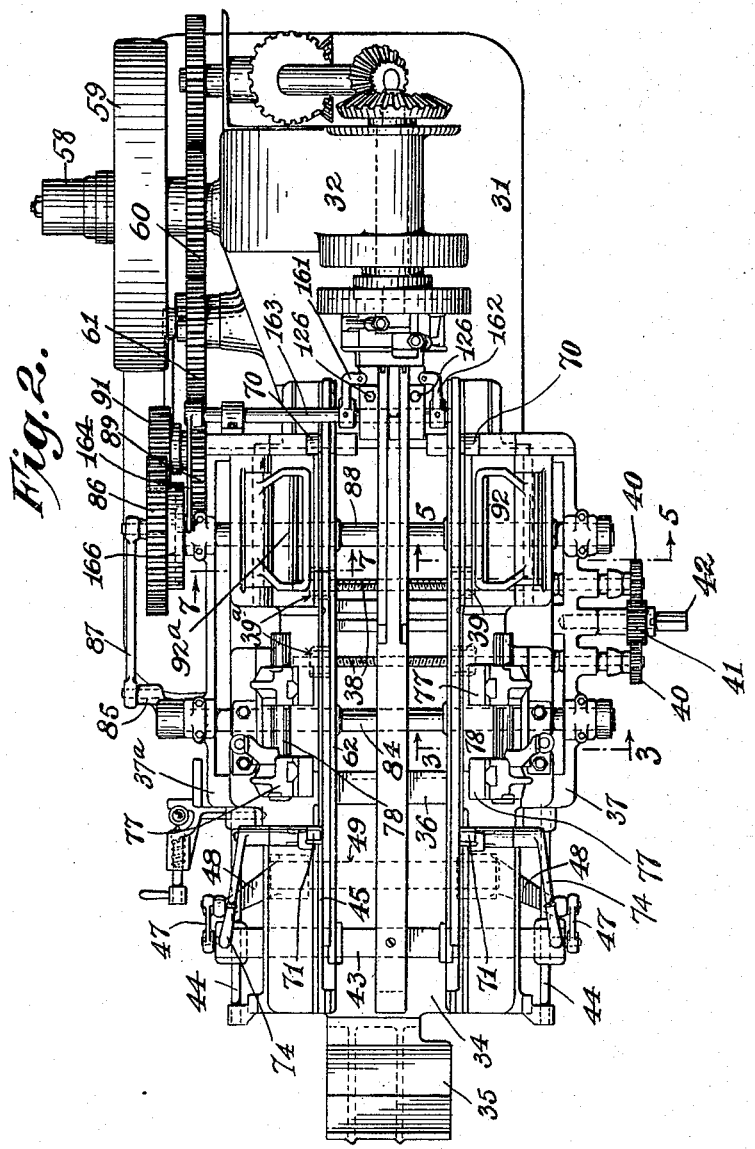
Figure 3:
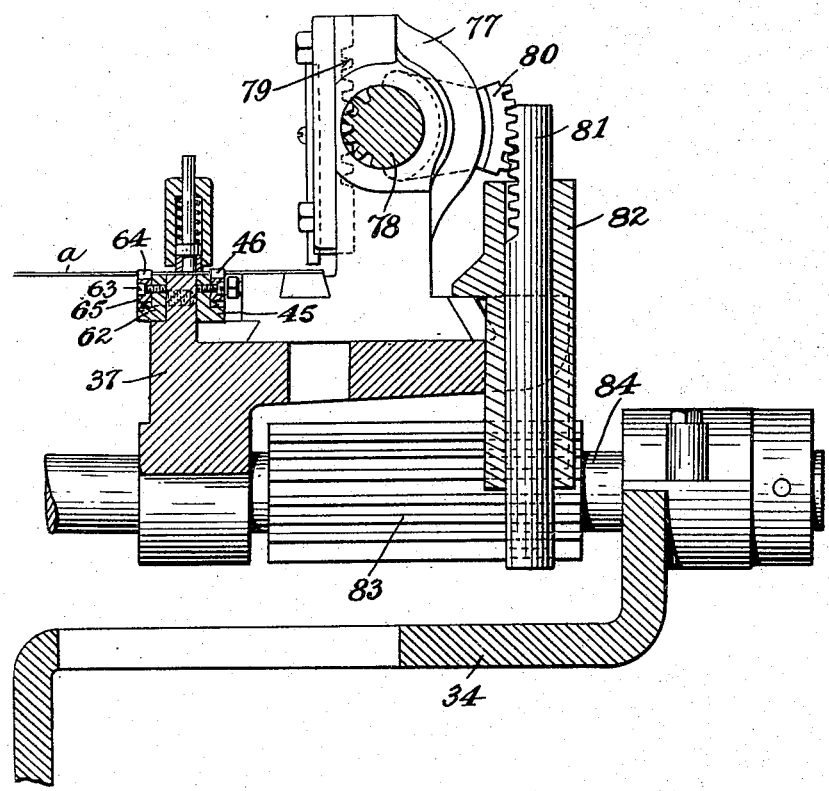
Figure 4:
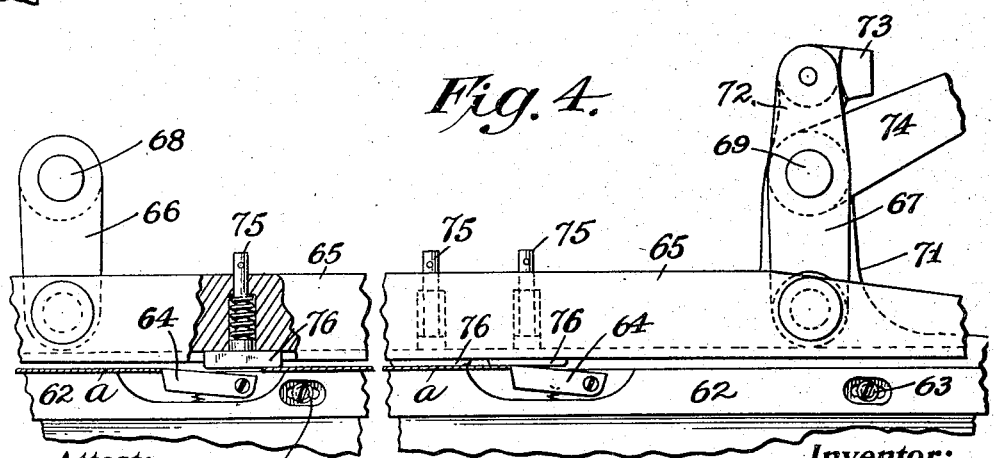
Figure 10:
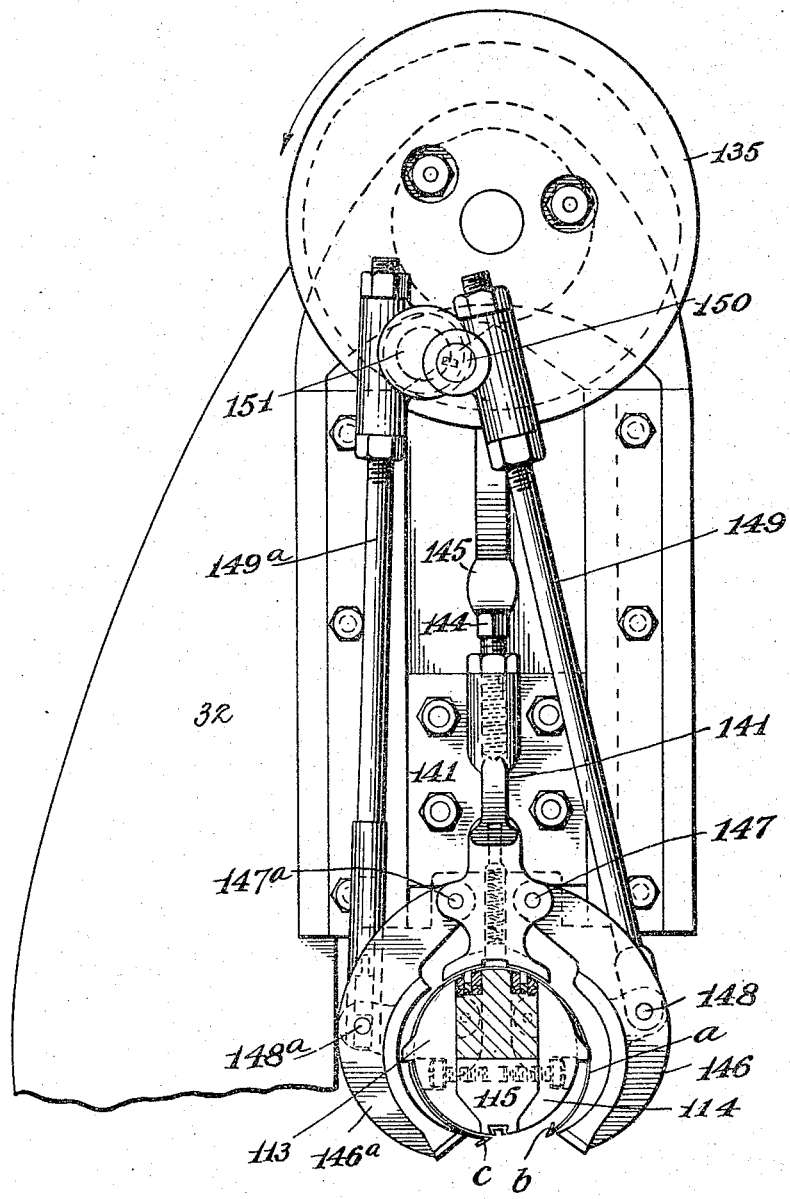

Figure 1 is a side elevation of a machine embodying my invention; Fig. 2 is a plan view thereof; Fig. 3 is a section taken substantially on the line 3—3 of Fig. 2, more particularly designed to show the arrangement of parts of the notching press; Fig. 4 is a detail side elevation of one set of feed and holding bars, as hereinafter described; Fig. 5 is an enlarged section taken substantially on the line 5—5 of Fig. 2, showing the "edging" or hook-forming device on one side of the machine, the parts being shown in an open position; Fig. 6 is a view similar to Fig. 5, showing the parts in a closed position after formation of the hook; Figs. 7 and 8 are enlarged views similar to Figs. 5 and 6, respectively, of the "edging" or hook-forming device on the other side of the machine; Fig. 9 is an enlarged front elevation of the blank-forming mechanism, the parts being shown in an open position; Fig. 10 is a view similar to Fig. 9 with the parts almost closed, and Fig. 11 a similar view with the parts fully closed; Fig. 12 is a section taken substantially on the line 12—12 of Fig. 11, some of the parts being shown in elevation; Fig. 13 is a detail section taken substantially on the line 13—13 of Fig. 12, showing in elevation the eccentric pin hereinafter described; Fig. 14 is an enlarged section taken substantially on the line 14—14 of Fig. 1, showing the details of the lock-seaming plunger; Fig. 15 is a detail section taken substantially on the line 15—15 of Fig. 12, showing additional details of the expanding horn and ejectment bars; Fig. 16 is a detail side elevation, partly in section, of the end of one of the ejectment bars, and Figs. 17 to 23, inclusive, are diagrammatic views illustrating the effect of each of the steps of the complete forming operation, from the flat blank to the lock-seamed can body.

Referring now to the drawings in detail, numeral 31 designates the heavy base of the supporting frame which includes the upright 32 and the pedestal 33, the latter being recessed to receive the end of the bed 34 which is securely bolted to said frame. At the outer end of the bed 34 is provided the bracket 35 so shaped as to furnish a convenient holder for a suitable supply of the flat blanks of sheet metal, such as the rectangular blank $a$ shown in Fig. 17, which are to be successively fed into the machine.

Mounted on the bed or bed-plate 34, in slide-ways 36, 36, are two castings 37 and 37$^a$, the former being on what I shall term the right-hand side and the latter on what I shall term the left-hand side of the machine. In order to provide for operation upon banks of different widths, to form can bodies of correspondingly different dimensions, as will subsequently appear, these castings 37 and 37$^a$ should be laterally adjustable with reference to each other. To this end, I have shown two screw-shafts 38 38, mounted in the bed 34, said shafts being right-and-left threaded through lugs 39 and 39$^a$, respectively, on the under side of the castings 37 and 37$^a$, as shown in dotted lines in Fig. 2. On said shafts 38 38 are mounted pinions 40 40 which mesh with a gear 41 on the stud-shaft 42, the latter having a squared end and thus being adapted to be rotated by a crank-handle or wrench. It will therefore be apparent that when the shaft 42 is rotated, the screw-shafts 38 38 will operate to move the castings 37 and 37$^a$ toward or away from each other, according to the direction of rotation of the shaft 42, in the slide-ways 36 36, and rigidly retain the same in any position of relative adjustment.

A reciprocating bar 43 is mounted on slides 44 44, and to this reciprocating bar are secured the feed bars 45 45 which have slide bearings in the castings 37 and 37$^a$. These feed bars 45 45 are correspondingly recessed at intervals, and in each of these recesses is provided a spring-pressed pawl 46, adapted to engage the end edge of a blank during movement of said feed bars in one direction and advance said blank, and to ride freely under said blank during movement of said feed bars in the other direction, in a manner substantially as illustrated in Fig. 4, although this figure shows stationary bars correspondingly provided with pawls, for the purpose of preventing backward movement of the blanks, as hereinafter described. To the ends of the reciprocating bar 43 are connected, through the medium of links 47 47, the ends of the arms 48 48 mounted on the rock-shaft 49. The shaft 49 is rocked from the shaft 50 by means of arms 51 and 52 on said shafts, respectively, and the connecting-rod 53, the shaft 50 being rocked by means of the arms 54 thereon and the pitman 55 pivoted to one face of the gear 56 on the shaft 57, suitably journaled in the frame of the machine. The gear 56 is driven from the main driving shaft 58, which preferably carries the fly-wheel 59, by means of a gear 60 on said shaft 58 in mesh with a gear 61, which, in turn, is in mesh with the gear 56. It will be apparent that in this manner the bar 43 will be reciprocated, and therewith the feed bars 45 45. As these feed bars are moved in one direction, the pawls 46 46 will engage the end edge of a blank and advance the latter with said bars, while when said bars are moved in the other direction the free ends of the pawls will be depressed against the actions of their springs and ride under said blank which is left in its advanced position.

To prevent backward movement of the blank under forces of friction, I mount a stationary bar 62 on the inner face of each of the castings 37 and 37$^a$, preferably secured thereto by means of cap-screws 63 63. These stationary bars 62 62, like the reciprocating bars 45 45, are recessed at intervals and in these recesses are provided the spring-pressed pawls 64 64, these pawls being adapted to engage the end edge of each blank as it is advanced and hold the same against backward movement after it has been brought to a position where it is to be operated upon by the "edging" or hook-forming devices. Furthermore, as the machine is designed to be run at high speed, it is desirable, if not essential, to provide means for preventing advancement of each blank a distance in excess of that desired, due to inertia, and for this purpose I provide holding bars 65 suspended by means of links 66 and 67, pivoted at 68 and 69, respectively, to brackets 70 and 71. The link 67 has an upwardly extending arm 72 adapted to engage a stop 73 on the bracket 71 and thus limit swinging movement in one direction of said holding bars 65, which may be raised and lowered by means of a lever 74 controlling pivotal movement of the link 67. The bars 65 are provided at regular intervals with spring-pressed plungers 75 75 provided with heads 76 76 which yieldingly press against the upper faces of the advancing blanks, generating sufficient friction to overcome inertia and insure the arrest of movement of the blank in precisely the proper position for the desired operation thereupon, but with pressure insufficient to interfere with advancing movement of the blank.

It has hereinbefore been stated that the movement of the advancing blank is intermittent, the several operations on said blank each being performed when the blanks are in conditions of rest. The first operation is that of notching the end edges of the blank, as shown in Fig. 18, in order to insure the provision of a lock seam throughout the major middle portion of the formed blank with merely overlapped portions at the ends of the seam or joint. A lock seam, so called, necessarily comprises at least four layers of metal, and a lock seam which extends throughout the entire length of the can body is objectionable in that the presence of four layers of metal interfere with the formation of hermetic end seals by the double seaming process of attaching the tops and bottoms of the containers. It has therefore been found to be desirable, if not necessary, to provide for the formation of a lock seam between the points at which the formed blank is flanged for the double seaming operation, leaving the metal in the flanges merely overlapped and therefore comprising but two layers of metal. This is the purpose of the notching of the flat blank. For this purpose, the blank is first carried under a set of four notching devices 77 77, coupled in pairs, each pair being mounted on the castings 37 and 37ª, respectively. The notching dies themselves are of common and well-known construction, performing their usual functions, and need not be described in detail here. The improved method of operation, however, is shown in Figs. 1, 2 and 3, with particular reference to Fig. 3, from which it will be seen that each pair of notching devices has mounted therebetween a shaft-pinion 78 in mesh with racks 79 which carry the punching dies. Each shaft pinion 78 has secured thereto a gear-segment 80 the teeth of which mesh with the teeth in the upper end of a vertical rack 81 slidable in the bearing 82 secured to the casting 37. At the lower end of the rack 81, disposed on said rack at an angle of 90° from the teeth at the upper end of said rack, are teeth (shown in dotted lines in Fig. 3) which mesh with the teeth of a cylindrical gear segment 83 on the rock-shaft 84 journaled in the bed 34.

Secured to the end of the rock-shaft 84, at what I have termed the left hand side of the machine, is an arm 85 which is oscillated from the gear 86 by means of the connecting pitman 87, the gear 86 being mounted on the shaft 88 which is suitably journaled in the bed 34 and being driven from the main driving shaft 58 by means of the gear 60 on said shaft driving a gear 89 on the shaft 90 through the medium of an idler gear 61, said shaft 90 carrying a pinion 91 in mesh with the gear 86. It will therefore be apparent that when the shaft 84 is rocked, through the gear train just described, proper dies being provided at the end of and below the rack-bar 79, the former will be vertically reciprocated to notch the end edges of the blank a as shown in Fig. 18.

The notching mechanism is timed to operate when the blank has been first brought to a condition of rest and the feed bars 45 45 are returning to engage the next succeeding blank. After the notching operation, the blank is again engaged by the feed bars and is again advanced to proper position in the "edging" or hook-forming mechanisms, the latter consisting in two somewhat similar devices, the device 92 for turning down or hooking one edge of the blank being mounted on the casting 37 on what I have termed the right-hand side of the machine, and the device 92ª for turning up or hooking the other edge of the blank being mounted on the casting 37ª on the left-hand side of the machine. This arrangement might obviously be reversed, the various parts being arranged to correspond, without departing from the spirit of my invention.

The casting 37 is shown provided with a rectangular opening formed by its side walls and two partitions 93 93, between which is mounted, on a pivot rod 94, a casting 95 in the form of a bell-crank lever having two upper arms 96 bridged by the connecting piece 97 which carries one of the coöperating edging tools 98, the length of the latter being slightly in excess of the width of the blank to be hooked—or the length of the can body to be formed. The lower arm 99 of the bell-crank lever carries at its end the roller 100, adapted to travel in cam-slot 101 formed on a cylindrical sleeve 102 on the shaft 88 between the bearings 103 103. Also mounted between the partitions 93 93 is the pivot rod or shaft 104 upon which is pivoted another bell-crank lever, the upper arm 105 of which is preferably in the form of an elongated solid member, substantially corresponding in length to the length of the connecting piece 97 carried by the upper arms 96 of the lever 95, and the lower arm 106 of which is provided with a roller 107 adapted to travel in a cam-slot or cam-groove 108 also formed in the cylinder 102. The upper arm 105 is provided with a recess within which is secured the other coöperating edging or hook-forming tool 109. Similarly mounted in the casting 37, adjacent to the tool 109, is a third coöperating tool 110, the latter substantially corresponding in length to the length of the other tools and being provided with a tapering edge, presented to the tool 109, which determines the shape of the hook to be formed. When the blank is being fed into the edging or hooking device, the edge of the blank between the notches is engaged by the lower face of the tapered edge of the tool 109 and slightly turned, the various parts being then in the position substantially as shown in Fig. 5. When advancing movement of the blank is checked, in the manner described, the lever 95 is rocked through the medium of the cam-slot 101, causing the flat lower face of the tool 98 to press down upon the blank a, just back of the edge thereof, thus holding said edge rigidly against the edge of the tool 110 and continuing such pressure throughout the edging operation. Immediately following operation of the lever 95, the cam-groove 108 rocks the arm 106 of the other lever, causing the tool 109 to move in the arc of a small circle in the direction of the tool 110.

It has been explained that the lower face of the edge of the tool 109 is tapered, in order to engage and preliminarily turn the edge of the blank, and it will be noted that the upper face of the edge of the tool is also tapered, in order that the same may pass under the tapered lower face of the edge of the tool 110, carrying therewith the edge of the blank which is thus bent around the edge of the tool 110, in a downward direction, as shown in Fig. 6. Similarly, the device 92ᵃ for turning up the opposite edge of the blank, is correspondingly mounted in the casting 37ᵃ on the opposite side of the machine. In this device, the bell-crank lever 95ᵃ corresponds in all essential respects to the lever 95 in the device 92, being pivoted on the pivot rod or shaft 94ᵃ carried by the partitions 93ᵃ which form parts of the casting 37ᵃ, and being similarly rocked through the medium of the cam-groove 101ᵃ in the sleeve 102ᵃ on the other end of the shaft 88, within which is adapted to travel the roller 100ᵃ at the end of the arm 99ᵃ of said lever. The tool 98ᵃ mounted at the end of the upper arm 96ᵃ of the lever 95ᵃ is the same as the tool 98 at the end of the upper arm of the lever 95 in the device 92, and while the upper tapering face of the edge of the tool has no particular function when the edge of the blank is to be down-turned, it has a function in the device 92ᵃ which is designed to up-turn the edge of the blank, as will shortly appear.

The tool 110ᵃ in the device 92ᵃ is precisely similar to the tool 110 and is similarly—although oppositely—mounted. On account of the fact that the direction of movement of the tool 109ᵃ must carry the working edge thereof over, instead of under, the edge of the tool 110ᵃ, the upper arm 105ᵃ of the lever carrying the former is slightly longer than the arm 105 of the corresponding lever in the device 92, and is somewhat differently disposed, as shown in Figs. 7 and 8, although the lower arm 106ᵃ of the lever in the device 92ᵃ is the same and similarly operated.

When the blank is being fed into the edging or hooking device 92ᵃ, the edge of the blank between the notches, on this side of the machine, is engaged by the upper face of the tapered edge of the tool 109ᵃ and slightly turned in an upward direction, the various parts being then in positions substantially as shown in Fig. 7. Advancing movement of the blank being checked, in the manner described, the lever 95ᵃ is rocked through the medium of the cam-slot 101ᵃ, causing the flat lower face of the tool 98ᵃ to press down upon the blank a just back of the edge thereof, rigidly clamping the same between said tool 98ᵃ and the tool 110ᵃ, in the same manner as that described in connection with the edging device 92 on the opposite side of the machine. It will be noted, however, that the tool 98ᵃ is provided with a tapering edge which has an upper face 111, so inclined and so located, after operation of the lever 95ᵃ, as to coöperate with the lower face of the tapered edge of the tool 109ᵃ, so that when the arm 105ᵃ is rocked, in the same manner as that described in connection with the arm 105, the edge of the blank a will be upwardly bent around the edge of the tool 98ᵃ, as shown in Fig. 8. As hereinbefore stated, the sleeves 102 and 102ᵃ are mounted on the shaft 88 which is rotated through the train of gears 86, 91, 89, 61 and 60 from the driving shaft 58.

Upon completion of the "edging" or "hooking" operation, the blank is again immediately engaged by the feed bars 45 and advanced in the manner described to the forming mechanism. When the edged blank has been brought to a condition of rest in the forming mechanism, it is located immediately above a sectional and substantially cylindrical body 112, known in this art as an expanding horn or mandrel. This expanding horn or mandrel 112 comprises three sections; two substantially similar and oppositely disposed outside sections 113 and 114, having outer faces of substantially cylindrical form, and a middle section 115, having an upper face of correspondingly cylindrical form and with which the outside sections or wings 113 and 114 have pivotal connection through the medium of lugs 116 and 117 on the inner faces of the sections 113 and 114, respectively, fitting into recesses 118 and 119 in the middle section 115 and mounted on the pivot rods 120 and 121. In the outside of each of the two sections or wings 113 and 114, I provide two recesses 122, each adapted to receive the head 123 of an adjusting screw 124, these screws 124 projecting through the sections 113 and 114 and into the section 115. These screws are not threaded into the sections 113 and 114, which slide freely thereover, whereby the heads 123 serve to limit outward movement of the wings 113 and 114 on their pivots 120 and 121. The horn 112, when the wings 113 and 114 have been moved away from each other to the limit prescribed by the heads 123 of the screws 124, should form a substantially true, although broken, cylinder.

The horn 112 is supported through the middle section 115, which is provided with a flat tail-piece 125 secured to the top of the pedestal 33 preferably by means of bolts 126, as shown in Figs. 2, 12 and 15.

Journaled in the top of the upright 32 is a shaft 127 which is rotated from the main driving shaft 58 by means of the gear 60 on the latter in mesh with a gear 128 on the short shaft 129 journaled in brackets projecting from the upright 32, the shaft 129 being further provided with a bevel-gear 130 meshing with a corresponding gear 131 on the vertical shaft 132, and the latter being provided with another bevel-gear 133 at the top thereof in mesh with a corresponding gear 134 on the shaft 127. On this shaft 127 is mounted a disk 135, on the inner face of which is provided a cam-slot 136 within which travels a roller 137 at the top of a vertically reciprocating casting 138 which slides in the ways 139 in the upright 32. To the casting 138 is secured, preferably by screw-bolts 140, a member 141 the bottom face of which is of circular or cylindrical configuration, the curvature being of substantially of the same diameter as that of the horn 112. In the middle of this circular face of the member 141 is a longitudinal groove or recess adapted to receive and contain the plate or bar 142 which is carried by a plurality (preferably three) of spring-pressed plungers 143, vertically mounted to slide in the member 141 and yieldingly press the bar 142 in a downward direction. To give rigidity to the structure, I also prefer to provide a screw-bolt 144 the head of which impinges against the lug or arm 145 projecting from the casting 138.

The cam-slot 136 is so positioned and disposed in the disk 135 as to cause downward movement of the casting 138 and the parts carried thereby immediately following the positioning of a blank in the forming mechanism. The first effect of this downward movement is the clamping of the blank between the plate or bar 142 and the middle section 115 of the horn 112 with sufficient yielding force to hold said blank securely in place, continued downward movement causing said bar 142 to recede into its recess while the curved lower face of the member 141 impinges against the blank and bends the latter to the configuration substantially as shown by the dotted lines in Fig. 9.

The forming mechanism proper comprises two wings 146 and 146$^a$, the former being located on the right side and the latter on the left side, as these terms have heretofore been used by me in describing this machine. These wings are pivoted at 147 and 147$^a$, respectively, to the member 141, and the configuration of the inner face of each of them is substantially cylindrical, the diameter approximating that of the horn 112 which they are adapted to partially envelop. To the outside of the wing 146 is pivoted at 148 a rod 149, the other end of which is pivoted on an eccentric pin 150 on the outer face of the disk 135. Similarly, a rod 149$^a$ is pivoted at 148$^a$ to the wing 146$^a$, the other end of which rod is pivoted on an offset portion 151 of the pin 150, so that the pivot of the rod 149 on the disk 135 is eccentric to the pivot of the rod 149$^a$. This construction is best illustrated in Fig. 13, wherein I have shown the pin 150 as comprising a portion 152 set into the disk 135 and secured therein by means of a key 153 (Fig. 12), a reduced portion 151 projecting therefrom and carrying the small concentric disk 154, and an end portion eccentrically located on said disk, the rod 149$^a$ being pivoted on the portion 151 and the rod 149 being pivoted on said eccentric end portion, both rods being retained on their pivots by means of the collar 155.

The cam-slot 136 in the disk 135 having operated in the manner described to depress the member 141 and bend the blank $a$ to the configuration shown by the broken lines in Fig. 9, and the wings 146 and 146$^a$ having been partially closed by the rods 149 and 149$^a$ which are moving downwardly as the eccentric pin 150 revolves with the disk 135 in the direction of the arrow, said wings are finally completely closed around the horn 112, carrying therewith opposite halves of the blank $a$, but by virtue of the eccentricity of the end portion of the pin 150, upon which the rod 149 is pivoted, with respect to the portion 151 of said pin, upon which the rod 149$^a$ is pivoted, the wing 146$^a$ is caused to close slightly in advance of the wing 146, and is so timed that when the closure is complete, the end edges of the blank are in the relative positions substantially as illustrated in Fig. 21. In the bottom of the middle section 115 of the horn 112, I provide a longitudinal slot within which is set a die-plate 156 having a longitudinal recess in the lower face thereof for the reception of the interhooked edges of the blank which are designed to be compressed therein to form the lock-seam of the can.

The two outside sections or wings 113 and 114 of the horn 112 are provided with lugs 157 and 158, respectively, located at the ends of said sections nearer the bed 34. These lugs are adapted to be engaged by the heads of adjustable screws 159 and 160 in the ends of a pair of levers 161 and 162. These levers 161 and 162 are mounted on a rock-shaft 163 which is journaled in the pedestal 33, which shaft is rocked by means of an arm 164 mounted on the end thereof, the end of said arm carrying the roller 165 operatively associated with the cam 166 on the shaft 88, as best shown in Figs. 1 and 2. The configuration of the cam 166 is such as to rock the shaft 163 immediately following complete closure of the folding wings 146 and 146ª, when the ends of the blank are in the relative positions substantially as illustrated in Fig. 21. The rocking of the shaft 163 operates through the levers 161 and 162 to raise the adjustable screws 159 and 160, which act against the lugs 157 and 158 to force the outer horn-sections 113 and 114 away from each other, thus having the effect of slightly expanding the horn. This expansion causes the hooked edges $b$ and $c$ of the blank to engage each other, as shown in Fig. 22, the interhooked edges now being ready for compression to form the lock-seam.

Mounted to slide vertically in ways 167 in the frame, and located below the forming mechanism just described, is the preferably solid casting 168 carrying the tool or die 169 of the same or slightly greater length than the length of the desired can-seam. The member 168 is vertically reciprocated by means of a pitman 169 preferably connected therewith by means of a ball (170) and socket joint, operated from the shaft 57 by means of the crank 171. These parts are so proportioned and related that the tool or die 169 is forced upwardly immediately following the interhooking operation, when the edges of the blank are in the relative positions shown in Fig. 22, and the interhooked portions of the blank are thereby forced into and compressed within the recess in the lower face of the die-plate 156, thus completing the formation of the lock-seam. The shaft 163 is now rocked to depress the levers 161 and 162, withdrawing the heads of the screws 159 and 160 from the lugs 157 and 158 on the outer horn-sections 113 and 114 and permitting contraction of the horn for the removal of the formed can body. This removal is accomplished by a pair of what I term "knock-off" bars 172, slidable in suitable grooves or recesses 173 in the top of the middle section 115 of the horn, and each provided with an upwardly spring-pressed pawl 174 which rides freely under the can body during movement of the bar in one direction but the end of which is sprung upwardly to engage the end edge of the can body upon movement in the other direction. These bars 172 are secured to the bar or elongated plate 175 which, in turn, is secured to the reciprocating bar 43, hereinbefore described, whereby the same mechanism which advances a blank to the forming device removes the formed can body therefrom. When pushed off the horn, the formed body is preferably delivered to a conveyer and carried thereby to a soldering machine, the latter forming no part of the present invention.

With reference to the pivotal connection between the rod 149ª and the folding wing 146ª, it is pointed out that the rod 149ª is provided with a slot within which the pivot 148ª rides, a spring-pressed plunger 176 being mounted within the end of said rod and bearing upon the pivot. This construction provides for a certain amount of elasticity in the operation of these parts, as is more or less essential when the rod 149ª is on-center and the machine is running at high speed.

It is to be noted that in operating and timing operations of the forming wings 146 and 146ª, I have eliminated all cams and levers, which are objectionable in that they necessitate more or less cumbersome and complicated mechanism, involve the use of parts which are necessarily the subjects of excessive wear and are difficult to replace, limit the speed at which the machine can be successfully operated, and are exceedingly difficult to adjust to properly time and satisfactorily perform their respective functions. Through the employment of a single pin which is not only eccentric with respect to the rotating element upon which it is mounted, but which provides pivots for the forming-wing-operating rods which are eccentric with respect to each other, I provide a construction which enables me to easily and quickly secure substantially perfect adjustment and substantially perfect timing of operations.

Furthermore, when it is desired to remove the expanding horn or mandrel, for purposes of repair or replacement, it will be noted that it is only necessary to remove the screws 126 which secure the tail-piece 125 of the middle section 115 of the horn to the pedestal 33, whereupon the horn in its entirety may be readily withdrawn. It will also be noted that when an imperfect blank is fed into the machine, such as one of insufficient dimensions, as very frequently happens, it may be readily removed by the operator before it has done any harm by merely raising the accessible hand-lever 74, which has the effect of raising the holding bars 65, the latter returning at once to proper operative positions when said lever is released.

Attention is furthermore directed to the fact that all of the adjusting screws employed in connection with the expanding horn are readily accessible, and permit of a fine adjustment rapidly and without difficulty.

With respect to the edging or hooking device, it is pointed out that through the employment of two levers carrying edging tools, one operating to hold the blank and the other to "edge" it, both levers having connection with the same actuating element, I secure results by direct movements, without complicated mechanism, simply and dependably.

Many modifications of minor details of my improved can-body forming machine will doubtless readily suggest themselves to those skilled in the art to which it appertains, and I therefore do not limit my invention to the specific construction herein shown and described.

I claim as new and desire to secure by Letters Patent:

1. In a machine of the character described, the combination, with a series of mechanisms for forming a can body from a flat sheet-metal blank, said series comprising preliminary notching and edging mechanisms and final forming and sealing mechanisms, of a track upon which said blanks travel into and through said preliminary mechanisms, means for advancing said blanks progressively along said track, and a frame which includes guide rails paralleling said track for retaining said blanks in position to be acted upon by said advancing means and said preliminary mechanisms, said frame having freedom of movement in a direction to effect withdrawal of the same to afford access to the blanks normally positioned thereby.

2. In a machine of the character described, the combination, with a series of mechanisms for forming a can body from a flat sheet-metal blank, said series comprising preliminary notching and edging mechanisms and final forming and sealing mechanisms, of a track upon which said blanks travel into and through said preliminary mechanisms, means for advancing said blanks progressively along said track, a yieldingly supported frame which includes guide rails paralleling said track for retaining said blanks in position to be acted upon by said advancing means and said preliminary mechanisms, said frame being free to move in a direction effecting withdrawal of the same from said track to afford access to the blanks normally retained in position thereby, and manually operable means for effecting such withdrawal.

3. In a machine of the character described, the combination, with a series of mechanisms for forming a can body from a flat sheet-metal blank, said series comprising preliminary notching and edging mechanisms and final forming and sealing mechanisms, of a track upon which said blanks travel into and through said preliminary mechanisms, means for advancing said blanks progressively along said track, a frame which includes guide rails paralleling said track for retaining said blanks in position to be acted upon by said advancing means and said preliminary mechanisms, and yielding means on said rails for braking said blanks against movement under inertia, said frame having freedom of movement in a direction to effect withdrawal of the same to afford access to the blanks normally positioned thereby.

4. In a machine of the character described, the combination, with a series of mechanisms for forming a can body from a flat sheet-metal blank, said series comprising preliminary notching and edging mechanisms and final forming and sealing mechanisms, of a track upon which said blanks travel into and through said preliminary mechanisms, means for advancing said blanks progressively along said track, a gravity-positioned frame which includes guide rails paralleling said track for retaining said blanks in position to be acted upon by said advancing means and said preliminary mechanisms, and yielding means on said rails for braking said blanks against movement under inertia, said frame being mounted to permit of ready elevation of the same against the forces of gravity to afford access to the blanks normally positioned thereby.

5. In a machine of the character described, the combination, with a series of mechanisms for forming a can body from a flat sheet-metal blank, said series comprising preliminary notching and edging mechanisms and final forming and sealing mechanisms, of a track upon which said blanks travel into and through said preliminary mechanisms, means for advancing said blanks progressively along said track, a gravity-positioned frame which includes guide rails paralleling said track for retaining said blanks in position to be acted upon by said advancing means and said preliminary mechanisms, yielding means on said rails for braking said blanks against movement under inertia, said frame being mounted to permit of ready elevation of the same against the forces of gravity to afford access to the blanks normally positioned thereby, and manually-operable means for effecting the elevation of said frame.

6. In a machine of the character described, the combination, with a series of mechanisms for forming a can body from a flat sheet-metal blank, of means for advancing said blanks progressively into and through the machine, a movable frame checked against movement in the direction of the advancing blanks and including guide rails paralleling said direction of movement for retaining said blanks in position to be acted upon by said advancing means, and manually operable means for moving said frame in a substantially opposite direction to effect withdrawal of the same and afford access to the blanks in transit.

7. In a machine of the character described, the combination, with a series of mechanisms for forming a can body from a flat sheet-metal blank, said series comprising preliminary notching and edging mechanisms and final forming and sealing mechanisms, of a track upon which said blanks travel into and through said preliminary mechanisms, means for advancing said blanks progressively along said track, a pivotally suspended frame which includes guide rails paralleling said track for retaining said blanks thereon in position to be operated upon by said advancing means and said preliminary mechanisms, and yielding means on said rails for braking said blanks against movement under inertia, said frame having a limited oscillatory movement in a direction to afford access to the blanks normally positioned thereby.

8. In a machine of the character described, the combination, with a series of mechanisms for forming a can body from a flat sheet-metal blank, said series comprising preliminary notching and edging mechanisms and final forming and sealing mechanisms of a track upon which said blanks travel into and through said preliminary mechanisms, means for advancing said blanks progressively along said track, a pivotally suspended frame which includes guide rails paralleling said track for retaining said blanks in position to be acted upon by said advancing means and said preliminary mechanisms, yielding means on said rails for braking said blanks against movement under inertia, said frame being capable of limited oscillation to afford access to the blanks positioned thereby, and manually operated means for facilitating oscillation of said frame.

9. In a machine for forming can bodies from flat sheet-metal blanks, the combination, with mechanism for notching opposite edges of each blank near the ends thereof, mechanism for folding over said edges between the notches in opposite directions, mechanism for bringing said oppositely folded edges into interhooked relation and compressing the interhooked portions into a tight seam, of a track upon which said blanks travel into and through said notching and folding mechanisms and to said interhooking and compressing mechanism, means for progressively advancing said blanks along said track, means for finally ejecting the formed can body, and a frame which includes guide rails paralleling said track for retaining said blanks in position to be acted upon by said advancing means and said notching and folding mechanisms, said frame being free to move in a direction effecting withdrawal of the same to afford access to the blanks normally positioned thereby.

10. In a machine for forming can bodies from flat sheet-metal blanks, the combination, with mechanisms for notching opposite edges of each blank near the ends thereof, mechanisms for folding over said edges between the notches in opposite directions, mechanisms for bringing said oppositely folded edges into interhooked relation and compressing the interhooked portions into a tight seam, of a track upon which said blanks travel into and through said notching and folding mechanisms and to said interhooking and compressing mechanisms, means for progressively advancing said blanks along said track into the first of said mechanisms and to each of the remaining mechanisms successively, means for finally ejecting the formed can bodies, a frame which includes guide rails paralleling said track for retaining said blanks in position to be acted upon by said advancing means and by said notching and folding mechanisms, said frame being free to move in a direction effecting withdrawal of the same to afford access to the blanks normally positioned thereby, and manually operable means for facilitating such withdrawal.

11. In a machine for forming can bodies from flat sheet-metal blanks, the combination, with mechanism for notching opposite edges of each blank near the ends thereof, mechanism for folding over said edges between the notches in opposite directions, mechanism for bringing said oppositely folded edges into interhooked relation and compressing the interhooked portions into a tight seam, of a track upon which said blanks travel into and through said notching and folding mechanisms and to said interlocking and compressing mechanisms, means for progressively advancing said blanks along said track, means for finally ejecting the formed can body, and a frame which includes guide rails paralleling said track for retaining said blanks thereon in position to be acted upon by said advancing means and said notching mechanisms, said rails being provided with yielding means serving as brakes to overcome inertia in the advancing blanks, and said frame being free to move in a direction effecting withdrawal of the same to afford access to the blanks normally positioned thereby.

12. In a machine for forming can bodies from flat sheet-metal blanks, the combination, with mechanisms for notching opposite edges of each blank near the ends thereof, mechanisms for folding over said edges between the notches in opposite directions, mechanisms for bringing said oppositely folded edges into interhooked relation and compressing the interhooked portions into a tight seam, of a track upon which said blanks travel into and through said notching and folding mechanisms and to said interhooking and compressing mechanisms, means for progressively advancing said blanks along said track into the first of said mechanisms and to each of the remaining mechanisms successively, means for finally ejecting the formed can bodies, a frame which includes guide rails paralleling said track for retaining said blanks in position to be acted upon by said advancing means and said notching and folding mechanisms, said rails being provided with yielding means serving as brakes to overcome inertia in the advancing blanks, said frame being free to move in a direction effecting withdrawal of the same to afford access to the blanks normally positioned thereby, and manually operable means for effecting such withdrawal.

13. In a machine for forming can bodies from flat sheet-metal blanks, the combination of mechanism for notching opposite edges of each blank near the ends thereof, mechanism for folding over said edges between the notches in opposite directions, mechanism for bringing said oppositely folded edges into interhooked relation and compressing the interhooked portions into a tight seam, means for progressively advancing said blanks to the first of said mechanisms and to each of the remaining mechanisms successively and finally ejecting the formed can bodies, a movable frame checked against movement in the direction of the advancing blanks and including guide rails which parallel the direction of movement of said blanks for retaining said blanks in position to be acted upon by said advancing means, and manually operable means for moving said frame in the other direction to effect withdrawal of the same to afford access to said blanks in transit.

14. In a machine for forming can bodies from flat sheet-metal blanks, the combination of mechanism for notching opposite edges of each blank near the ends thereof, mechanism for folding over said edges between the notches in opposite directions, mechanism for bringing said oppositely folded edges into interhooked relation and compressing the interhooked portions into a tight seam, means for progressively advancing said blanks into the first of said mechanisms and to each of the remaining mechanisms successively and finally ejecting the formed can bodies, and a movable frame checked against movement in the direction of the advancing blanks and including guide rails paralleling the direction of movement of said blanks for retaining said blanks in said advancing means and overcoming inertia, and said frame being movable in the other direction to effect withdrawal of said rails from the blanks positioned thereby to afford access to said blanks in transit.

15. In a device of the character described, the combination, with mechanisms for simultaneously notching opposite edges of a sheet-metal blank preliminary to forming the same into a can body, and means for advancing blanks progressively into and through the machine and properly positioning each thereof in transit in said mechanism, of means for actuating each of said notching mechanisms operable in any one of various relative positions of the latter, whereby the same may be laterally positioned to accommodate blanks of varying dimensions, and means for positioning both of said mechanisms and their actuating means from a single adjusting element.

16. In a device for notching the edges of a sheet-metal blank preliminary to forming the same into a can body, the combination, with means for advancing said blank and properly positioning the same in said device, of notching dies and means for actuating one thereof which comprises a rack and a pinion, primary actuating means, and connecting means between said pinion and said primary actuating means to rock said pinion, said dies with their supports and said connecting means being positionally adjustable as a unitary instrumentality with relation to said primary actuating means.

17. In a device for notching the edges of progressively fed sheet-metal blanks preliminary to forming each thereof successively into can body, the combination, with means for advancing each blank and properly positioning the same in said device, of notching dies, means for operating said dies which comprise a rack and a pinion, means for rocking said pinion, primary actuating means, and connecting means between said rocking means and said primary actuating means to actuate said die-operating means in any one of various positions of adjustment to accommodate blanks of varying dimensions.

18. In a device for notching the edges of a sheet-metal blank preliminary to forming the same into a can body, the combination, with means for advancing said blank and properly positioning the same in said device, of notching dies and means for actuating one thereof which comprises a rack, a shaft-pinion in mesh therewith, a gear-segment secured to said shaft-pinion, a reciprocating rack to oscillate said gear-segment and rock said shaft-pinion, and means for reciprocating said last-mentioned rack in various positions of said rack, geared-segment, shaft-pinion, first-mentioned rack and dies as a unitary instrumentality.

19. In a device for notching the edges of progressively-fed sheet-metal blanks preliminary to forming each thereof into a can body, the combination, with means for advancing each blank and properly positioning the same in said device, of notching dies, means for actuating at least one thereof which comprises a rack, a shaft-pinion in mesh therewith and gear-segment secured to said shaft-pinion, reciprocating rack to oscillate said gear-segment and rock said shaft-pinion, and an elongated pinion to reciprocate said last-mentioned rack, whereby said rack with said gear segment, shaft-pinion, first-mentioned rack and dies as a unitary instrumentality are operable in various positions of adjustment along said elongated pinion.

20. Mechanism for folding over the end edge of a sheet-metal blank, preliminary to forming the same into a can body, which comprises a pivoted lever for clamping said blank near the edge thereof and a pivoted lever for folding over said edge, each of said levers being in direct engagement with a common actuating element.

21. Mechanism for folding over the end edge of a sheet-metal blank, preliminary to forming the same into a can body, which consists in a lever for clamping said blank near the edge thereof and a lever for folding over said edge, both of said levers being mounted on fixed pivots and having direct connection with a common actuating element.

22. Mechanism for folding over the end edge of a sheet-metal blank, preliminary to forming the same into a can body, which comprises a lever for clamping said blank near the edge thereof and a lever for folding over said edge, both of said levers being mounted upon fixed pivots and having direct connection with a common element.

23. In a device for simultaneously folding over opposite end edges of a sheet-metal blank, preliminary to forming the same into a can body, the combination, with mechanism for advancing said blank and properly positioning the same in said device, of independent and oppositely located instrumentalities for performing said folding operations, each of said instrumentalities comprising a lever for clamping said blank near the edge to be folded and a lever for folding over said edge, both of said levers being mounted on fixed pivots and having direct connection with a common actuating element.

24. In a device for simultaneously folding over opposite end edges of a sheet-metal blank, preliminary to forming the same into a can body, the combination, with mechanism for advancing said blank and properly positioning the same in said device, of independent and oppositely located instrumentalities for performing said folding operations, each of said instrumentalities comprising a lever for clamping said blank near the edge to be folded and a lever for folding over said edge, both of said levers being mounted upon fixed pivots and having direct connection with cams on a common actuating element.

25. In a device for simultaneously folding over opposite end edges of a sheet-metal blank preliminary to forming the same into a can body, the combination, with mechanism for advancing said blank and properly positioning the same in said device, of independent and oppositely located instrumentalities actuated from a common moving element for performing said folding operations, each of said instrumentalities comprising means for clamping said blank near the edge to be folded and means for folding over said edge, each of said means consisting in a single member and both having direct connection with and being operated from said moving element, and means for adjustably varying the distance between said instrumentalities to accommodate blanks of various dimensions.

26. In a device for simultaneously folding over opposite end edges of a sheet-metal blank preliminary to forming the same into a can body, the combination, with mechanism for advancing said blank and properly positioning the same in said device, of independent and oppositely located instrumentalities actuated from a common rotating element for performing said folding operations, each of said instrumentalities comprising means for clamping said blank near the edge to be folded and means for folding over said edge, each of said means consisting in a single member and both having direct connection with and being operated from cams on said rotating element, and means for adjustably varying the distance between said instrumentalities to accommodate blanks of various dimensions.

27. Mechanism for folding over the end edge of a sheet-metal blank preliminary to forming the same into a can body, which comprises a pivoted lever provided with a tool for clamping said blank near the edge thereof, and a pivoted lever provided with a tool for folding over said edge, both of said levers having direct connection with and being oscillated from a common actuating element.

28. Mechanism for folding over the end edge of a sheet-metal blank preliminary to forming the same into a can body, which comprises a pivoted lever provided with a tool for clamping said blank near the edge thereof, and a pivoted lever provided with a tool for folding over said edge, both of said levers having direct connection with and being oscillated from the cams on the same rotating element.

29. In a device for folding over the end edge of a sheet-metal blank preliminary to forming the same into a can body, the combination, with means for advancing said blank and properly positioning the same in said device and means for clamping the same therein near the edge to be folded, of means for partially folding said edge while the blank is being positioned in the device, said last-mentioned means being further operable to complete the folding operation.

30. In a device for folding over the end edge of a sheet-metal blank preliminary to forming the same into a can body, the combination, with means for advancing said blank and properly positioning the same in said device, and means for clamping the same therein near the edge to be folded, of means for partially folding said edge while the blank is being positioned in the device, said last-mentioned means being further operable to complete the folding operation, and said clamping means and said folding means being directly actuated from the same rotating moving element.

31. In a device for folding over the end edge of a sheet-metal blank preliminary to forming the same into a can body, the combination, with means for advancing said blank and properly positioning the same in said device, and means for clamping the same therein near the edge to be folded, of a lever-actuated tool shaped and positioned to partially fold said edge while the blank is being positioned in the device and subsequently complete the folding operation.

32. In a device for folding over the end edge of a sheet-metal blank preliminary to forming the same into a can body, the combination, with means for advancing said blank and properly positioning the same in the device, of a lever-actuated tool for clamping said blank near the edge to be folded, and a lever-actuated tool shaped and positioned to partially fold said edge while the blank is being positioned in the device and subsequently complete the folding operation, both levers being directly operated from the same rotating element.

33. Mechanism for forming a can body from a flat blank, which consists in a mandrel, a pair of wings movable to embrace said mandrel and shape a blank therebetween, and actuating means for said wings comprising a continuously rotating element and connecting rods, said rods being eccentrically pivoted on said rotating element and the pivots being eccentric with respect to each other.

34. Mechanism for forming a can body from a substantially flat blank, which consists in a mandrel, a pair of wings movable to embrace said mandrel and shape a blank therebetween, and actuating means for said wings comprising a continuously rotating element and connecting rods, said rotating element being provided with an eccentrically mounted pin providing pivots for said rods which are eccentric to each other.

35. Mechanism for forming a can body from a flat blank having oppositely hooked end edges, which consists of a mandrel, a pair of pivoted wings operable to embrace said mandrel and shape a blank therebetween, and actuating means for said wings comprising a continuously rotating element and connecting rods, said rotating element having eccentrically mounted thereon a pin which provides pivots for said rods which are eccentric to each other, whereby operation of one of said wings is completed slightly in advance of the other to bring the end edges of the blank into interhooked relation.

36. Mechanism for forming a can body from a flat blank having oppositely hooked end edges, which consists in a mandrel, a pair of pivoted wings operable to embrace said mandrel and shape a blank therebetween, actuating means for said wings comprising a continuously rotating element and connecting rods, said rods being eccentrically pivoted on said rotating element and the pivots being eccentric with respect to each other, whereby operation of one of said wings is completed slightly in advance of the other to bring the end edges of the blank into interhooked relation, and means for compressing the interhooked portions into a tight seam.

37. Mechanism for forming a can body from a flat blank which consists of a mandrel, a pair of wings movable to embrace said mandrel and shape a blank therebetween, and actuating means for said wings, said mandrel comprising a supported middle or interior portion and side or exterior portions pivoted thereto and movable on their pivots to have the effect of expanding said mandrel, and means for positively moving said side portions on their pivots to expand said mandrel immediately following operation of said wings, said last-mentioned means in its entirely being wholly exterior to said mandrel.

38. Mechanism for forming a can body from a flat blank which consists of a mandrel, a pair of wings movable to embrace said mandrel and shape a blank therebetween, actuating means for said wings, said mandrel comprising a supported middle or interior portion and side or exterior portions having pivotal connection therewith and movable on their pivots to have the effect of expanding said mandrel, each of said side portions being provided with an exteriorly located shoulder, and means reciprocable to engage said shoulders and move said side portions on their pivots to expand said mandrel immediately following operation of said wings.

In testimony of the foregoing I have hereunto set my hand this 14th day of October, 1913.

PAUL R. HAHNEMANN.

Witnesses:
W. L. S. LANGERMAN,
A. M. HORSTMAN.

Copies of this patent may be obtained for five cents each, by addressing the "Commissioner of Patents, Washington, D. C."